United States Patent [19]

Lerner et al.

[11] 4,015,755
[45] Apr. 5, 1977

[54] ELECTROMAGNETICALLY ACTUATABLE METERING VALVE FOR SUCCESSIVE DELIVERY OF MEASURED VOLUMES OF FLUID FROM A FLUID RESERVOIR

[76] Inventors: Edward Lerner, 3 Marshall St., Irvington, N.J. 07111; John A. Ventura, 32 Jefferson St., Nutley, N.J. 07110

[22] Filed: Dec. 12, 1975

[21] Appl. No.: 640,069

[52] U.S. Cl. ............................ 222/442; 222/453; 222/504
[51] Int. Cl.² .................................... G01F 11/30
[58] Field of Search ............... 222/453, 504, 442; 251/141

[56] References Cited

UNITED STATES PATENTS

| | | | |
|---|---|---|---|
| 1,342,173 | 1/1920 | Joslin | 222/453 |
| 2,887,255 | 5/1959 | Bauerlein | 222/453 |
| 3,072,302 | 1/1963 | Giovannoni et al. | 222/453 |

*Primary Examiner*—Drayton E. Hoffman
*Assistant Examiner*—Fred A. Silverberg
*Attorney, Agent, or Firm*—Carella, Bain, Gilfillan & Rhodes

[57] ABSTRACT

A metering valve, preferably electromagnetically actuatable, for the successive delivery of precisely measured volumes of fluid irrespective of inlet fluid pressure, including a valve core, slidably mounted in a cavity in the valve body, the top of the core closing a normally open fluid inlet when the core is moved to an uppermost position, and the bottom of the core closing a fluid discharge outlet when in its normal lowermost position, the volume of fluid discharged being the volumetric difference between the volume of the cavity and the volumetric displacement of the core.

6 Claims, 3 Drawing Figures

4,015,755

ELECTROMAGNETICALLY ACTUATABLE METERING VALVE FOR SUCCESSIVE DELIVERY OF MEASURED VOLUMES OF FLUID FROM A FLUID RESERVOIR

BACKGROUND OF THE INVENTION

This invention relates to metering valves generally and specifically to an electromagnetically actuatable metering valve for the delivery of successive, measured volumes of fluid from a fluid reservoir such as syrups and the like which are usually dispensed at soda fountains or in beverage dispensing machines.

One of the problems common to manually or automatically operated systems for dispensing soda fountain syrups or other fluids is the inability to dispense precise volumes of fluid on successive occasions. Currently, the method of choice is to rely upon the operator's experience in estimating the appropriate volume of fluid in manually operated systems or upon valve means which are automatically governed to open for a fixed period of time It has been found that both systems result in wide variations in the volume of fluid dispensed. In the case of manual operation, variations result from the inability of even the same operator to dispense precisely the same volume of fluid on each successive occasion, the problem being compounded from operator to operator. In the case of automatically controlled valves with a fixed time base, the discharged volume is a function of the pressure head imposed upon the valve while open, the greater the pressure head the greater the quantity of fluid dispensed.

Syrup or other fluid cost is a significant factor in the economy of both manually and automatically operable systems. Additionally, the quality of the beverage dispensed can and usually is adversely affected by significant variations in the quantity of fluid dispensed.

The present invention relates to a metering valve which is adapted to dispense a precisely measured volume of fluid on each successive actuation thereby eliminating both the waste of costly fluids and the adverse effect on quality of the beverage dispensed generated by variations in fluid ratios.

Additionally, the metering valve disclosed and claimed herein may be quickly and easily disassembled for cleaning without damaging or otherwise requiring the immersion of electrical parts thereby insuring dependable service over long periods of time.

It is among the objects and advantages of the present invention to provide a metering valve which will dispense a precisely measured volume of fluid on each successive actuation, which volume is substantially independent of the fluid head imposed upon the valve by the fluid reservoir.

Another object of the present invention is to provide a metering valve which may be electromagnetically actuated by a coil external to and detached from the valve body.

A further object of the present invention is to provide a metering valve which may be manually or automatically open on a loosely governed time base without altering the precise volume of fluid dispensed.

Yet still another object of the present invention is to provide a metering valve which will not open when there is insufficient fluid available to meet the metered requirement due to the emptying of the reservoir or otherwise.

SUMMARY OF INVENTION

An electromagnetically operable metering valve for the successive delivery of measured volumes of fluid from a fluid reservoir comprising an elongated, hollow valve body closed at the top and at the bottom and defining an interior valve cavity; fluid inlet means communicating with the cavity proximal to the top of the body; fluid discharge means proximal to the bottom of the cavity; a valve core seated in the cavity movable toward and away from the top and the bottom of the body, the volumetric displacement of the core being less than that of the cavity; first closure means on the core proximal to the top thereof operatively engageable with the inlet means to close the same to the inlet flow of fluid when the core is moved to an uppermost position; second closure means on the core proximal to the bottom thereof operatively engageable with the discharge means to close the same to the discharge flow of fluid when the core is moved to a lowermost position; the inlet means being open when the core is in the lowermost position and the discharge means being open when the core is in the uppermost position; and means for moving the core.

PREFERRED EMBODIMENT OF INVENTION

Figure 1:
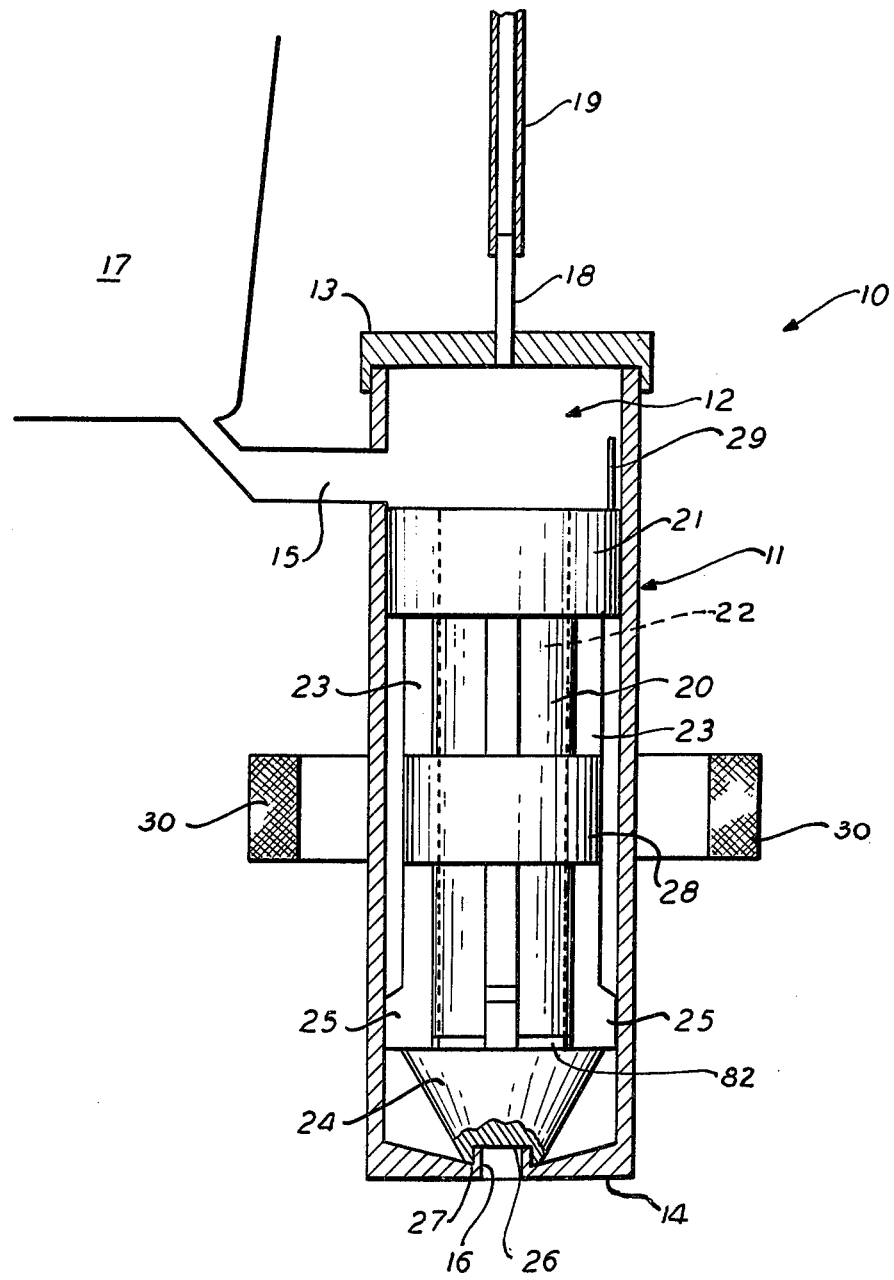
FIG. 1 is a side elevational, partially broken away view of a metering valve illustrative of the invention claimed herein, the valve being attached to a feed reservoir.

Referring now to the drawings in detail and in particular FIG. 1, the metering valve 10 comprises an elongated, generally cylindrical hollow body 11 defining a generally cylindrical cavity 12. The valve body 11 is provided with a top 13 and a bottom 14. A fluid inlet conduit 15 passes through the valve body 11 proximal to the top 13 thereof communicating with the cavity 12. A fluid discharge orifice 16 extends through the bottom 14 of the valve body 11.

The fluid inlet conduit 15 communicates with a fluid reservoir 17. An air relief conduit 18 extends through the top 13 and preferably is connected to the reservoir 17 by means of a flexible plastic tube 19.

A valve core 20 is slidably seated within the cavity 12. The core 20 comprises an upper cylindrical portion 21 defining closure means for the fluid inlet conduit 15 when the core is in the uppermost position. The cylindrical portion is provided with a central passage 22.

Four radially disposed, generally depending ribs 23, 23 etc. are formed on the bottom of the cylindrical portion 21. A generally conical bottom plug 24 is formed on the bottom of the ribs 23. The ribs 23 are disposed inwardly in non-engaging relationship to the interior surface of the valve body except at the plug 24 wherein the ribs 23 are flared radially outwardly to define guide edges 25 in contact with the interior wall of the body 11.

The bottom of the plug 24 is provided with a centrally disposed well 26 which is engageable with an upstanding lip 27 peripheral to the fluid discharge orifice 16. The well 26 and lip 27 are closely dimensioned to each other to provide, when engaged, a closure of the discharge orifice 16.

A magnetically permeable metal ring 28 is secured circumferentially around the ribs 23, 23 etc. generally intermediate the upper cylindrical portion 21 and the plug 24 of the core 20. Additionally, a stop 29 is mounted on the top of the cylindrical portion 21 and is engageable with the top 13 of the valve body 11 thereby limiting the upward movement of the core 20.

In operation, the valve body 11 is oriented with its long axis in a generally vertical plane sufficient to cause the core 20 to slide to the lowermost position as illustrated in FIG. 1 closing the fluid discharge orifice 16. An electromagnetic coil 30 is positioned in electromagnetic influencing position with respect to the rings 28, the coil 30 preferably being detachable from the valve body 11.

When the core 20 is in its lowermost position, the fluid inlet conduit 15 is open such that fluid flows over the top of the upper cylindrical portion 21, downwardly through the central passage 22 to collect in the cavity 12 therebeneath. The reservoir 17 is preferably positioned above the top 13 of the valve 10 with the result that pressure fills the cavity 12 to the top 13 with air being discharged through the air relief conduit 18. The cross sectional area of the air relief conduit 18 and plastic tube 19 are preferably very small. Depending upon the cross-sectional area thereof, and the pressure imposed by the fluid head in the reservoir, some small but relatively insignificant quantity of fluid may pass upwardly through the air relief conduit 18 and into the plastic tube 19. However, capillary action is generally sufficient to prevent any passage of fluid back into the reservoir 17 particularly if the topmost level of the plastic tube 19 is above the level of the fluid in the reservoir 17.

The volume of fluid metered by the valve 10 comprises the volume of the cavity 12 less the volumetric displacement of the core 20.

When the coil 30 is energized, the core 20 is urged upwardly closing the fluid inlet conduit 15 and generally simultaneously opening the fluid discharge orifice 16. Fluid within the cavity 12 is drained in its entirety, no new fluid passing into the cavity because of the closure effected by the upper cylindrical portion 21 of the core 20 extending over the end of the fluid inlet conduit 15. Upward movement of the core 20 is limited by the stop 29.

When the coil 30 is deenergized, the core 20 slides downwardly in the cavity 12 under the influence of gravity closing the fluid discharge orifice 16 and reopening the fluid inlet conduit 15. Fluid thereupon passes into the cavity 12 until it is full as set forth above. The valve is now ready for a second discharge operation. Of course, the total dwell time or coil energization during each discharge operation is sufficient to insure total discharge of the fluid within the cavity 12. However, the total volume of fluid discharge is quite independent of that time so long as the time is sufficient for total discharge. Moreover, the volume of discharge is independent of the fluid head in the reservoir 17 because the reservoir is sealed from the cavity 12 when the discharge orifice 16 is open.

Figure 2:
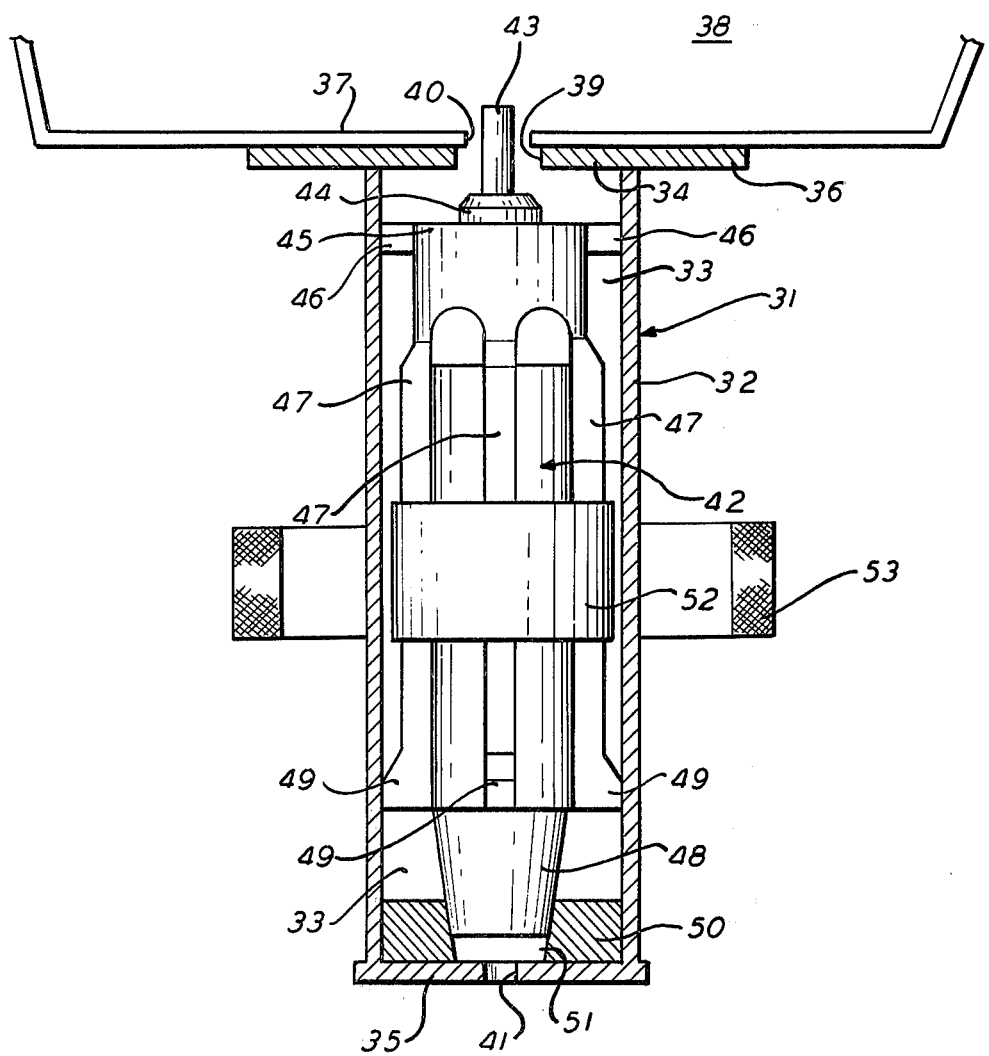
FIG. 2 is a side elevational, partially broken away view of an alternative form of metering valve attached to a feed reservoir in a fashion different than that illustrated in FIG. 1.

Referring now to FIG. 2, an alternate form of metering valve 31 is shown. Metering valve 31 comprises an elongated generally cylindrical valve body 32 defining a cavity 33. The valve body is provided with a top 34 and a bottom 35. The top 34 is provided with an integral, radial flange 36 which is fastened to the bottom 37 of a reservoir 38. The top 34 is provided with a generally axial opening 39 communicating with an opening 40 in the bottom 37 of reservoir 38. Openings 39 and 40 define a fluid inlet conduit to the cavity 33. The bottom 35 of the valve body 32 is provided with a generally axial fluid discharge orifice 41.

A valve core 42 is slidably positioned within the cavity 33. The core 42 comprises a top stem 43 which normally extends upwardly through the openings 39 and 40. A top plug 44 is formed on the bottom of the stem 43 and is adapted to tightly fit within opening 39 thereby closing the fluid inlet conduit communicating between the reservoir 38 and the cavity 33.

An upper radially extending guide 45 is formed on the bottom of the plug 44 the edges of which engage the interior wall of the valve body 32. The guide 45 is provided with a plurality of peripheral passages 46 which permit fluid to pass downwardly into the lower portions of the cavity 33.

The core 42 is provided with four radial ribs 47, etc. which depend from a position proximal to the guide 44 downwardly to a bottom plug 48. The bottom portions of the ribs 47 are provided with guides 49 which engage the interior surface of the valve body 32 in a fashion similar to that of the radial guide 45.

The bottom of the valve body 32 is provided with a thickened floor 50 having a generally axial passage 51 communicating with orifice 41. The plug 48 is generally frusto-conical as is the passage 51, the tube being dimensioned such that the plug 48 is adapted to close the passage 51 when the core 42 is in the lowermost position.

A paramagnetic ring 52 is mounted on the ribs 47, 47 etc. generally intermediate the top and bottom of portions of the core 42. A coil 53 is positioned in electromagnetic influencing position with respect to the rings 52 such that when the coil 53 is energized, the core 42 is urged upwardly to its uppermost position.

In operation, the core 42 is normally urged into its lowermost position as illustrated in FIG. 2 under the influence of gravity. Fluid in reservoir 38 passes through openings 39 and 40 into cavity 33 until cavity 33 is filled. Air initially in cavity 33 escapes upwardly through openings 39 and 40 into the reservoir 38 where venting occurs.

When the coil 53 is energized, the core 42 rises until the plug 44 seeps within opening 39 thereby closing the fluid inlet conduit comprised of openings 39 and 40. Simultaneously, plug 48 withdraws from passage 51 thereby opening communication between the cavity 33 and the discharge orifice 41 whereupon fluid discharges from the cavity 33. When the cavity 33 is empty of fluid, the coil 53 is deenergized and the core 42 gravitationally drops to its lowermost position.

As it is in the case of the embodiment of the invention illustrated in FIG. 1, the time during which the coil is energized does not govern the amount of fluid discharged as long as the time is sufficient for total discharge. Moreover, the fluid head in reservoir 38 does not affect the volume of fluid discharged from the valve 31 because the reservoir 38 is isolated from the cavity 33 during discharge.

The valve core is preferably fabricated of some plastic material inert to the fluids passing through the valve. Additionally, plastic materials are sufficiently light to insure upward movement of the core under the influence of an electromagnetic coil whether the form of the core shown in FIG. 1 or the form shown in FIG. 2 is employed. However, the weight of the core should be governed by the volumetric displacement of the core, the density of the fluid being handled and the strength of the electromagnet such that if the fluid fails to fully fill the cavity within the valve body, the buoyant effect of the displacement of the valve core will be just insufficient to permit the coil to overcome gravity. Thus, the core will not move when the coil is energized. This will serve as a easily recognized indicia that either the reservoir is empty or that the inlet means to the valve cavity is blocked. This insures against accidental discharge of a volume less than the volume of the cavity less the volumetric displacement of the core.

Figure 3:
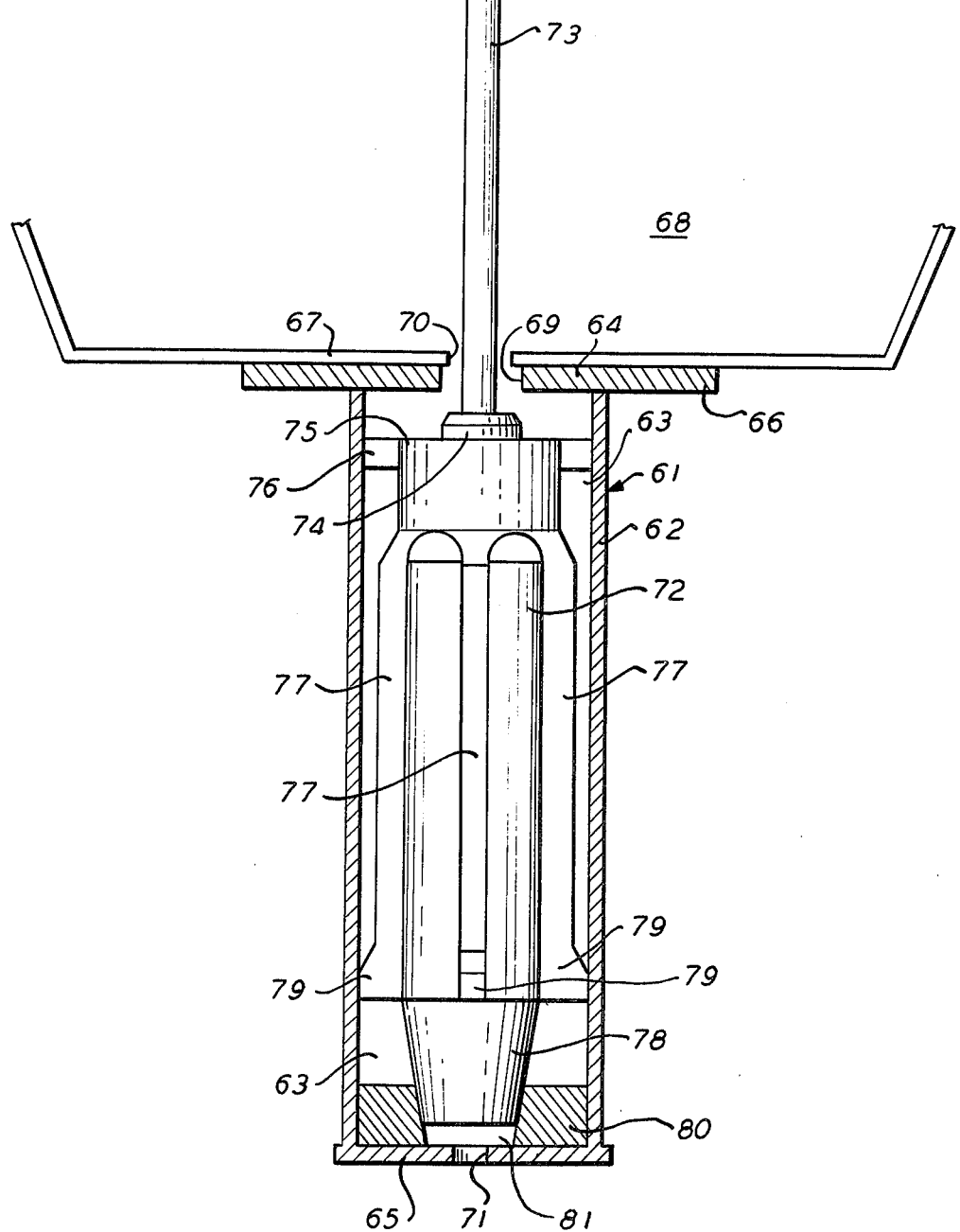
FIG. 3 is a side elevational, partially broken away view of the metering valve shown in FIG. 2 with an alternative form of actuating mechanism.

Referring now to FIG. 3, an alternate form of metering valve 61 is shown. Metering valve 61 is similar to metering valve 31 disclosed in FIG. 2, however, metering valve 61 provides for an alternative actuation location. Metering valve 61 comprises an elongated generally cylindrical valve body 62 defining a cavity 63. The valve body is provided with a top 64 and a bottom 65. The top 64 is provided with an integral. radial flange 66 which is fastened to the bottom 67 of a reservoir 68. The top 64 is provided with a generally axial opening 69 communicating with an opening 70 in the bottom 67 of reservoir 68. Openings 69 and 70 define a fluid inlet conduit to the cavity 63. The bottom 65 of the valve body 62 is provided with a generally axial fluid discharge orifice 71.

A valve core 72 is slidably positioned within the cavity 63. The core 72 comprises a top stem 73 which extends upwardly through openings 69 and 70 and terminates at a point above reservoir 68. A top plug 74 is formed on the bottom of the stem 73 and is adapted to tightly fit within the opening 69 thereby closing the fluid inlet conduit communicating between the reservoir 68 and the cavity 63.

An upper radially extending die 75 is formed on the bottom of the plug 74 the edges of which engage the interior wall of valve body 62. The guide 75 is provided with a plurality of peripheral passages 76 which permit fluid to pass downwardly into the lower portion of the cavity 63.

The core 72 is provided with four radial ribs 77, etc. which depend from a position proximal to the guide 74 downwardly to the bottom plug 78. The bottom portions of the ribs 77 are provided with guides 79 which engage the interior surface of the valve body 62 in a fashion similar to that of the radial guide 75.

The bottom of the valve body 62 is provided with a thickened floor 80 having a generally axial passage 81 communicating with orifice 71. The plug 78 is generally frust-conical, as is the passage 81, the tube being dimensioned such that the plug 78 is adapted to close the passage 81 when the core 72 is in the lowermost position.

A paramagnetic ring 82 is mounted on top stem 73 at a point above reservoir 68. A coil 83 is positioned in electromagnetic influencing position with respect to ring 82 such that when coil 83 is energized, the core 72 is urged upwardly to its uppermost position.

In operation, the embodiment disclosed by FIG. 3 operates in an identical fashion with the embodiment disclosed in FIG. 2. The embodiment disclosed in FIG. 3 permits the electromagnetic coil to be positioned in an alternative location and still permits the operator to benefit from the advantages of this metering valve.

What is claimed is:

1. An electromagnetically operable metering valve for the successive delivery of measured volumes of fluid of a predetermined density from a fluid reservoir comprising:
   an elongated, hollow valve body closed at the top and the bottom and defining an interior valve cavity;
   fluid inlet means communicating with said cavity proximal to said top of said body;
   fluid discharge means proximal to said bottom of said cavity;
   a valve core of predetermined material seated in said cavity, movable toward and away from said top and said bottom of said body;
   first closure means on said core, proximal to said top thereof, and operably engageable with said inlet means to effect a seal of said inlet means when said core is moved to an uppermost position;
   second closure means on said core proximal to said bottom thereof operatively engageable with said discharge means to effect a seal of said discharge means when said core is moved by gravity to a lowermost position;
   magnetic means operatively connected to said valve core;
   electromagnetic means positioned proximal to said valve body and at a predetermined position with respect thereto;
   said electromagnetic means for establishing a predetermined electromagnetic field for attracting said magnetic means and for thereby urging said valve core from said lowermost position upwardly into said uppermost position; and
   said valve core of said predetermined material being of a predetermined weight such that: (i) said predetermined electromagnetic field is insufficient alone to move said valve core from said lowermost position upwardly into said uppermost position, (ii) upon said valve body being filled with said fluid the buoyant effect of said fluid on said valve core is insufficient alone to overcome said gravity and move said valve core out of said lowermost position, and (iii) the combined buoyant effect of said fluid on said valve core upon said fluid filling said valve body and the establishment of said predetermined electromagnetic field are required to move said valve core from said lowermost position upwardly into said uppermost position thereby preventing delivery of said fluid from said metering valve unless said valve body is filled with said fluid.

2. A metering valve according to claim 1, wherein said hollow valve body has a longitudinally extending vertical axis said valve body having a removably secured air relief conduit disposed vertically above said discharge means, and wherein said inlet means is disposed intermediate to said air relief conduit and said discharge means.

3. A metering valve according to claim 2 wherein said valve core comprises:
   a hollow cylindrical upper section substantially identical in cross sectional area with said interior of said valve body;
   a frusto-conical bottom section cooperatively engageable with said discharge means to seal said discharge means under the influence of gravity;

a plurality of rib members disposed vertically intermediately to said upper and lower sections and secured thereto, said rib members spaced symmetrically about said longitudinally vertical axis of said valve core, said rib members having a flange portion so as to maintain slidably intimate contact with said valve body;

wherein said magnetic means is a metal conductive ring circumferentially disposed about said ring members and secured thereto; and wherein said metering valve further includes a stop secured to said hollow cylindrical upper section, said stop cooperative with said top of said valve body so as to position said cylindrical upper section adjacent to said inlet port when said valve core is in its uppermost position.

4. A metering valve according to claim 1 wherein said valve body comprises:

a hollow casing having a longitudinally extending vertical axis and wherein said inlet means is provided at the top of said casing and disposed vertically above said discharge means.

5. A metering valve according to claim 4 wherein said valve core comprises:

a frusto-conical bottom section cooperatively engageable with said discharge means to seal said discharge means under the influence of gravity;

a closed upper section substantially identical in cross-sectional area to said inlet means and cooperatively engageable therewith so as to seal said inlet means when said valve core is in its uppermost position;

a plurality of rib members disposed vertically intermediately to said upper and lower sections and secured thereto, said rib members spaced symmetrically about said longitudinally vertical axis of said valve core, and said rib members having a flange to maintain slidably intimate contact with said valve body; and wherein said magnetic means is a metal conductive ring circumferentially disposed about said rib member and secured thereto.

6. A metering valve according to claim 4 wherein said valve core comprises:

a frusto-conical bottom section cooperatively engageable with said discharge means to seal said discharge means under the influence of gravity;

a closed upper section substantially identical in cross-sectional area to said inlet means and cooperatively engageable therewith so as to seal said inlet means when said valve core is in its uppermost position;

a plurality of rib members disposed vertically intermediately to said upper and lower sections and secured thereto, said rib members spaced symmetrically about said longitudinally vertical axis of said valve core, and said rib members having a flange to maintain slidably intimate contact with said valve body; and wherein said closed upper section of said valve core has secured thereto a vertically longitudinally disposed shaft extending through said reservoir to a point above said reservoir, said longitudinally vertically extending shaft having attached thereto, at a point above said reservoir, said longitudinally vertically extending shaft having attached thereto, at a point above said level of said fluid reservoir, said magnetic means.

* * * * *